Alexander S. T. Lagaard
By Caswell & Lagaard
Attorneys

July 23, 1940.  A. S. T. LAGAARD  2,208,875
DOUGHNUT MACHINE
Filed Sept. 9, 1938   2 Sheets-Sheet 2

Inventor
Alexander S. T. Lagaard
By Caswell & Lagaard
Attorneys

Patented July 23, 1940

2,208,875

UNITED STATES PATENT OFFICE 2,208,875

DOUGHNUT MACHINE

Alexander S. T. Lagaard, Minneapolis, Minn.

Application September 9, 1938, Serial No. 229,103

9 Claims. (Cl. 53—7)

My invention relates to doughnut machines and particularly to doughnut machines in which the doughnuts are progressed along a channel in a kettle throughout a circuitous course by means of the flow of the cooking liquid.

An object of the invention resides in providing a doughnut machine in which the various levels of the cooking liquid in the channel are maintained constant within predetermined limits.

Another object of the invention resides in providing a doughnut machine in which the elevation of the cooking liquid in the channel is maintained substantially constant regardless of the amount of cooking liquid consumed in the operation of the machine.

An object of the invention resides in utilizing a portion of the kettle as a reservoir and in drawing the cooking liquid from the reservoir and delivering the same into the channel.

Another object of the invention resides in utilizing a dam in the channel of the kettle over which the cooking liquid passes and by means of which the elevation of the cooking liquid is maintained.

A feature of the invention resides in arranging said dam at the discharge end of the channel.

An object of the invention resides in causing the cooking liquid flowing over the dam to discharge into the reservoir.

A feature of the invention resides in constructing the dam with a weir over which the cooking liquid travels.

An object of the invention resides in arranging a drain and clean out at the lowermost portion of the reservoir.

A still further object of the invention resides in constructing the doughnut machine with a hood within which portions of the channel along which the doughnuts travel is disposed.

Another object of the invention resides in constructing the channel with a loop extending outwardly of the hood and in providing flow impelling means and a doughnut cutter outwardly of the said case and disposed at said loop.

A still further object of the invention resides in providing a transmission for operating the doughnut machine and in disposing said transmission outwardly of the case and to one side of the loop.

With the foregoing and other objects in view, which will appear in the following description, the invention resides in the novel combination and arrangement of parts and in the details of construction hereinafter illustrated and/or described.

Figure 1:
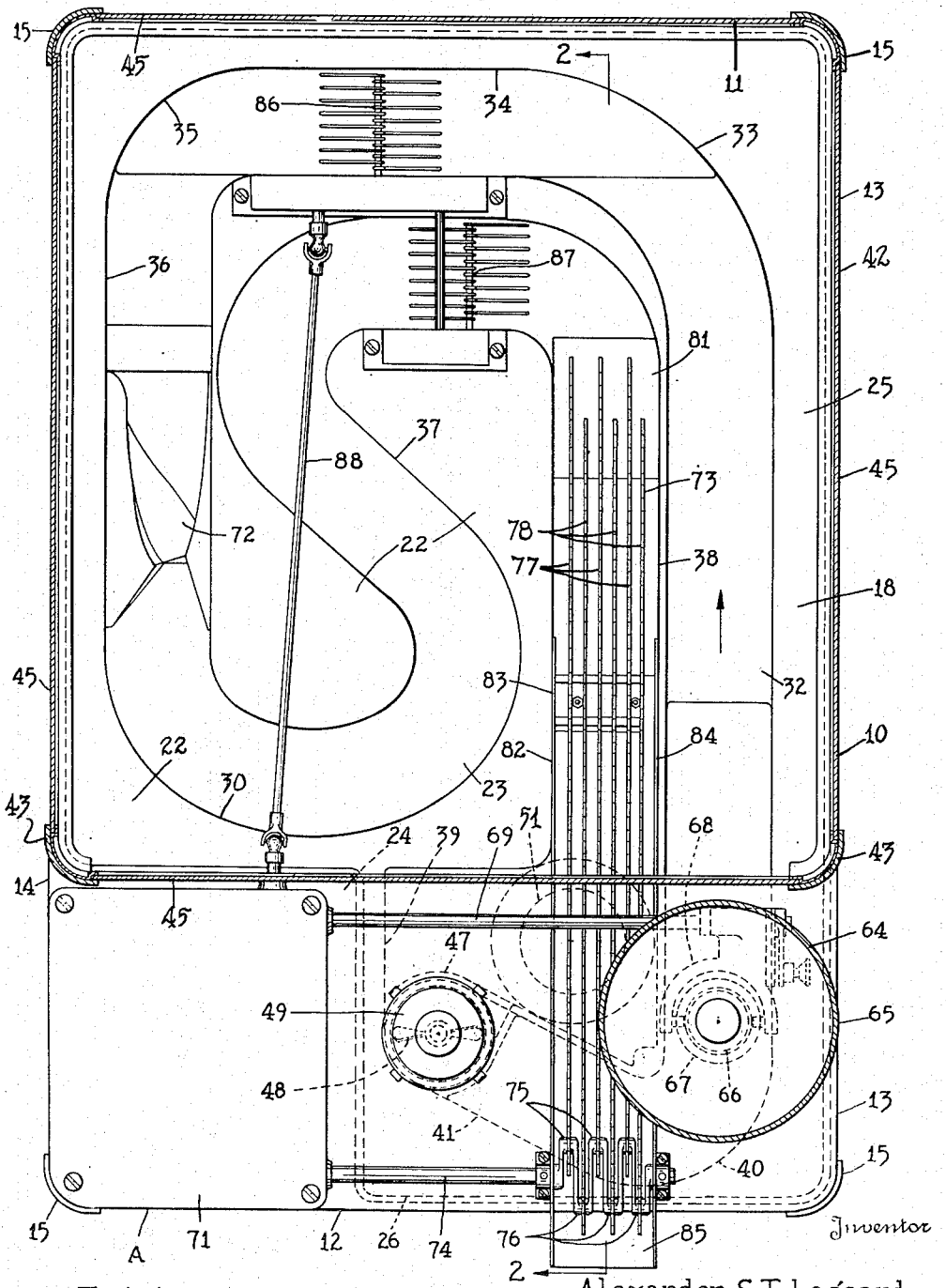
Fig. 1 is a plan sectional view of a doughnut machine illustrating an embodiment of my invention.
Figure 2:
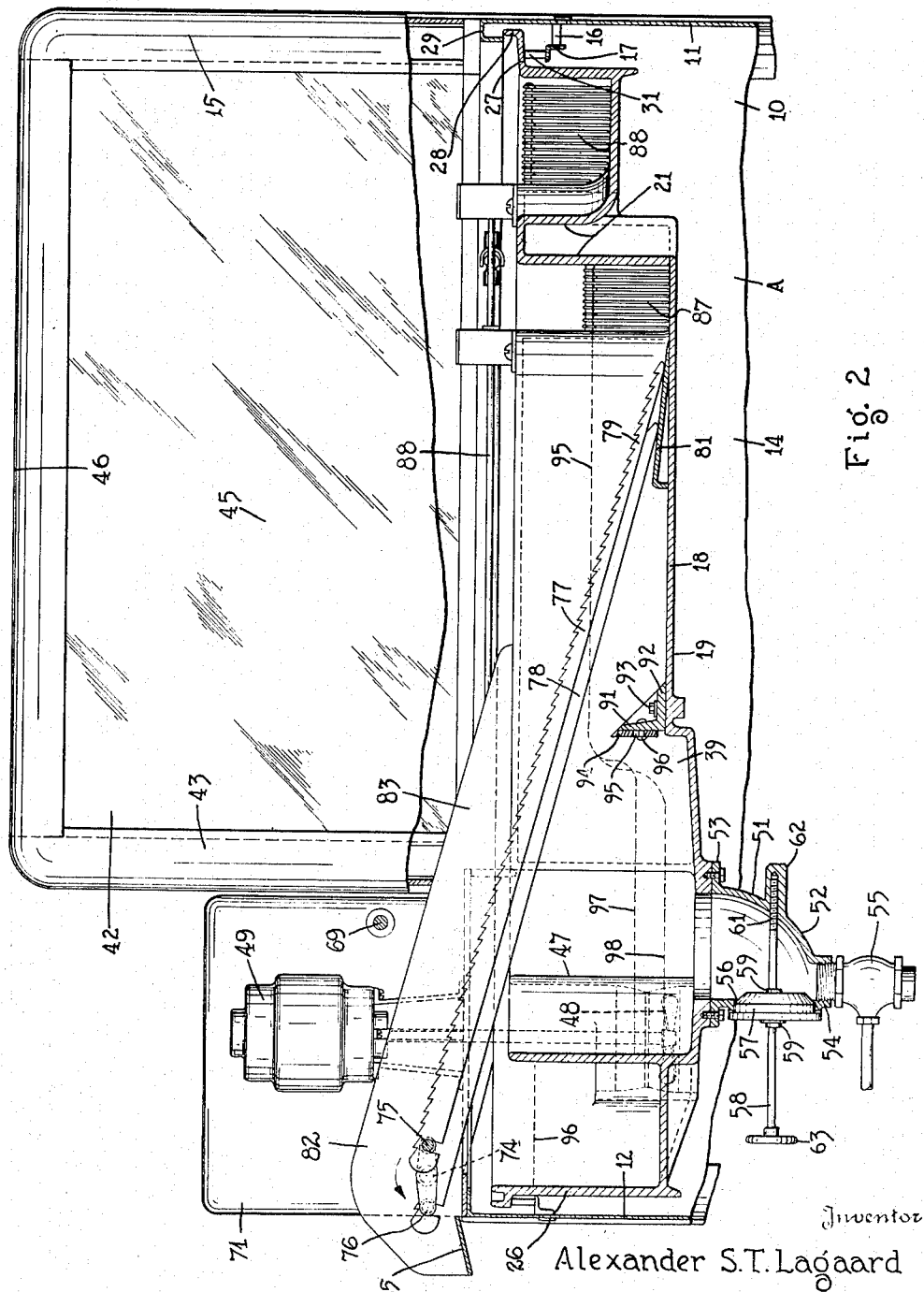
Fig. 2 is an elevational sectional view taken on line 2—2 of Fig. 1.

In the operation of doughnut machines in which the doughnuts are propelled throughout a channel by the flow of the cooking liquid and particularly where a twisted tube turner is used, considerable difficulty is encountered when the elevation of the cooking liquid in the channel varies as a result of the absorption of cooking liquid by the doughnuts or evaporation or destruction thereof through heat. The present invention provides a construction by means of which a surplus amount of cooking liquid may be maintained in a reservoir, from which cooking liquid is drawn, and in which the elevation of the cooking liquid in the channel is maintained substantially constant, regardless of the amount of cooking liquid in the reservoir, thus overcoming the objections to the prior art constructions.

In the drawings I have shown a doughnut machine A which consists of a case 10 constructed with end walls 11 and 12 and side walls 13 and 14 connected therewith. The case includes uprights 15 disposed at the outer corners of the same which extend throughout the height of the case and to which the various walls are attached. Secured to the various uprights 15, by means of brackets 16, are angle frame members 17, which stiffen the case and which serve as supports for the kettle of the invention.

Within the case 10 is disposed a cooking kettle 18 which is preferably of cast material and which is constructed with a bottom 19 and with vertical walls 21 extending upwardly therefrom. The vertical walls are connected at their upper ends with upper walls 22 and the various walls are so arranged as to form a channel 23, which extends throughout the major portion of the kettle and which provides a way along which the doughnuts may travel. The kettle 18 has one corner of the same removed as designated at 24, leaving a main portion 25 of the width of the case 10 and of a length equal to about two-thirds of the length of the same. This construction also provides an extension 26 to the kettle which extends up to the end wall 12. The kettle 10 is constructed with a ledge 27 extending about the margin of the same, which terminates in a lip 28 projecting upwardly from the extreme edge thereof. A guard 29 on the case 10 issues inwardly from the walls thereof and overlies the lip 28, thereby protecting the same and at the same time being spaced therefrom to retard transmission of heat from the kettle to the case. The kettle 18 is supported on the angle frame members 17 through supporting blocks 31, which are situated at spaced intervals throughout the length thereof.

The channel 23 is arranged to provide a straight run 32 which commences in close proximity to wall 12 and follows along wall 13. The channel 23 at the end of run 32 makes a curve 33, which leads into another straight run 34 following along the wall 11. At the end of this run the channel has another curve 35 which leads into still another straight run 36, which follows along the wall 14. At the end of the run 36 the channel is constructed with a loop 30 which communicates with an S-shaped run 37. The latter run communicates with a straight run 38 which run is parallel with the run 32. The run 38 discharges into a reservoir 39, which is merely an enlargement of said run. From this reservoir a short run 41 is provided which forms part of a loop 40 connected to the beginning of the run 32.

The major portion 25 of kettle 18 is enclosed by means of a hood 42. This hood utilizes the uprights 15 at the end wall 11 and two other uprights 43 which are attached to the case 10 at the locality of the end of the major portion 25 of the kettle formed by the corner 24. Between these uprights are provided glass panels 45 which are slidably supported in guides 50 whereby the said panels may be removed. The entire hood is closed by a top 46 constructed of metal and attached to the uprights 15 and 43. The hood is so designed that the same encloses the runs 33, 34, 35, 36, 30 and 37 and the major portions of the runs 38 and 32, leaving part of the reservoir 39 and the loop 40 disposed outwardly of said hood.

In the reservoir 39 is provided a vertical tubular duct 47 which communicates at its lower end with the bottom of the reservoir 39. In this duct is disposed a propeller or elevator 48 which is mounted on the armature shaft of a motor 49. The duct 47 communicates at its upper end with the run 41 of the channel 23, thus discharging the cooking liquid from the reservoir 39 and into the run 41 of the channel, from which it flows throughout the course of the channel and is returned into reservoir 39.

At the lowermost portion of the reservoir 39 is arranged a clean out 51, which also serves as a sump for collecting crumbs and other solid material formed in the operation of the machine. This construction utilizes an elbow 52, which is constructed with a flange 53 bolted to the underside of the bottom 19 of the kettle 18. The elbow 52 is constructed at its lower end with a boss 54 threaded to receive a valve 55 which serves as a drain for draining out the cooking liquid from the machine. The forward portion of the elbow 52 is constructed with an opening 56, which is adapted to be closed by a flanged plug 57. A spindle 58 extends through this plug and is rotatably mounted relative thereto by means of collars 59 attached to said spindle. Spindle 58 is threaded at its innermost end, as designated at 61, to screw into a threaded boss 62, formed on the rearward side of the elbow 52. A handle 63, secured to the spindle 58, serves to rotate the same. The opening 56 is of substantial dimensions so that when the spindle 58 is disengaged from the boss 62, the entire side of the elbow is opened, thus giving access to the interior thereof and permitting of readily cleaning out accumulations of the crumbs and other material which would not pass through the valve 55. Valve 55 is utilized in normal use for draining out the cooking liquid while the plug 57 is periodically employed to remove the matter which does not pass through the valve.

Situated at the beginning of the run 32 of channel 23 is a doughnut former 64, which comprises a receptacle 65 for dough and a cutter 66 connected therewith. Such construction being well known in the art will not be described in detail in this application. The cutter 66 includes a flanged sleeve 67 which severs dough extrusions from the mass contained in receptacle 65. This sleeve is reciprocated in opposite directions by means of a forked arm 68, which is mounted on a shaft 69. Shaft 69 is operated by a motor and transmission enclosed within a transmission housing 71. Inasmuch as the driving mechanism for the shaft 69 does not form a feature of the instant invention, the same has not been illustrated. It will thus readily become apparent that doughnuts extruded from the doughnut former 64 are deposited in the flowing cooking liquid which travels along the run 32 of channel 23 in the direction of the arrow.

In the run 36 of channel 23 is arranged a twisted tubular turner 72. This turner inverts the doughnuts after the same have been cooked a predetermined length of time so that the said doughnuts may be cooked equally on both sides thereof.

In the run 38 of channel 23 is disposed an ejector 73 for removing the cooked doughnuts from the cooking liquid. This ejector comprises a shaft 74 which is constantly driven from the transmission within the housing 71. This shaft has mounted on it oppositely extending cranks 75 and 76. Sets of toothed blades 77 and 78 are mounted on the said cranks and are adapted to be alternately raised and lowered as the shaft 74 rotates. The lower ends 79 of these blades slide upon an inclined rest 81 which is mounted on the bottom 19 of the receptacle 18 in the portion of the run 38 leading from the S-shaped run 37. It will readily be comprehended that as the doughnuts reach the said blades, the doughnuts are elevated and progressed upwardly and outwardly of the cooking kettle 18. The ejector 73 is disposed within a trough 82 constructed with two side plates 83 and 84 and a bottom 85 at the discharge end thereof, which directs the doughnuts upon leaving the ejector outwardly of the machine.

For controlling the rate of travel of the doughnuts along the channel 23 two controlling devices 86 and 87 are employed. These control devices operate to allow the doughnuts, one at a time, to enter the turner 72 and the ejector 73. These control devices are operated by a shaft 88 driven from the transmission within the housing 71 and are moved periodically at predetermined intervals. Inasmuch as any desired construction may be used for this purpose and since this construction does not form a particular feature of the instant invention, the details thereof have not been shown, nor will the same be described specifically. Where the machine is of fairly large capacity, the control devices 86 and 87 may be omitted and the rate of flow of the cooking liquid utilized to time the cooking of the doughnuts.

The invention comprises a dam 91 which extends across the run 38 of the channel 23, at the locality of the beginning of the reservoir 39. The cooking liquid in flowing through the channel 23 passes over this dam, which serves as a weir and is maintained at a predetermined elevation thereby. Inasmuch as the height of the liquid passing over a weir for a given velocity of flow is substantially constant, regardless of the elevation of the liquid below the weir, it becomes possible to maintain the elevation of the cooking liquid in the channel 23 substantially fixed as long as the flow continues. It will readily be comprehended that the elevation of the cooking liquid throughout the channel varies due to the flow of the same and particularly at the turner 72 where an appreciable drop occurs. However, the dam 91 functions to maintain relatively fixed elevations of the cooking liquid at the various points in the course of the channel so that the doughnut machine operates as desired. The dam 91 consists of an angle member 92, which fits snugly between the walls of the run 38 and which is secured to the bottom 19 by means of cap screws 93. An adjustable weir 94, having slots 95 therein, is attached to the angle member 92 by means of screws 96. This weir may be raised and lowered to adjust the elevation of the cooking liquid and serves to produce the desired results. The elevation of the cooking liquid in the run 38 is designated by the reference numeral 95. The elevation of the cooking liquid in the run 32 and 41 is indicated by the reference numeral 96. The limits of the elevation of the cooking liquid in the reservoir 39 is indicated by the reference numerals 97 and 98. It will be noted that appreciable variation is possible, so that the machine may be run for an extended period of time in the intended manner without replenishing the cooking liquid consumed or lost.

The operation of the invention is obvious. The cooking liquid is brought up to the desired temperature by heating means, not shown in the drawings, and so maintained throughout the use of the invention. Upon energizing motor 49, the cooking liquid is drawn from the reservoir 39 and discharged into the run 41 of channel 23. Where the speed of the motor or the capacity of the propeller 48 is variable the same are adjusted until the proper rate of flow of the cooking liquid is procured. When this speed has been determined the weir 94 is adjusted until the elevation of the cooking liquid at the entrance of the turner 72 is proper. Thereafter the machine continues to operate without attention. When the elevation of the cooking liquid in the reservoir 39 drops sufficiently, the operator replenishes the cooking liquid by adding more thereto. As long as the highest level of the cooking liquid in the reservoir 39 is somewhat below the level in the run 38 the levels of the cooking liquid in the channel remain constant. After operation of the machine, the cooking liquid is drained through the valve 55 and when accumulations of crumbs and other material occur in the clean out 51, the plug 57 is removed and access into the interior of the same is readily had. In draining the cooking liquid from the machine, the dam 91 may be loosened to allow the cooking liquid held back by the same to escape beneath said dam, or the same may be constructed so as to provide a small amount of leakage insufficient to interfere with the operation of the machine but sufficient to permit of the flow of cooking liquid into the reservoir 39 when the impeller 48 is not in operation. If desired, a by-pass may be provided between the channel 38 and the reservoir 39 and around the dam 91 controlled by a valve so that the cooking liquid may be allowed to rapidly flow to the reservoir 39 and through the drain 55.

The advantages of my invention are manifest. A doughnut machine constructed in accordance with my invention is extremely simple and practical to operate requiring a minimum amount of attention on the part of the operator. As long as sufficient cooking liquid is contained in the reservoir the proper elevation of the cooking liquid through the channel is procured. In the event that the valve, through which the cooking liquid is drained, becomes plugged by means of crumbs or foreign matter, the plug in the clean out may be removed and access may be had to the interior of the clean out. By the utilization of the loop on the channel, and by arranging said loop exteriorly of the hood the fumes are confined from the hood from which the same may be readily removed, while at the same time the propeller and doughnut former are exposed exteriorly of the hood where the same are not subject to the high temperatures within the hood. In this manner the machine will operate without pre-cooking of the dough in the doughnut former and without injury to the motor of the impeller. By arranging the parts, as disclosed, an extremely compact construction is provided which occupies a minimum amount of space.

Changes in the specific form of my invention as herein disclosed, may be made within the scope of what is claimed without departing from the spirit of my invention.

Having described my invention, what I claim as new and desire to protect by Letters Patent is:

1. In a doughnut machine, a kettle having a channel along which the doughnuts are progressed through the flow of the cooking liquid, a reservoir at the end of said channel into which the cooking liquid discharges, a dam extending across said channel at the discharge end thereof and maintaining the elevation of the cooking liquid in said channel substantially constant, the elevation of said cooking liquid in said reservoir being lower than that in said channel and means for raising the cooking liquid in said reservoir to the beginning of said channel.

2. In a doughnut machine, a kettle having a channel along which the doughnuts are progressed through the flow of the cooking liquid, a reservoir at the end of said channel into which the cooking liquid discharges, a member extending across said channel from the bottom thereof to within a short distance of the surface of the cooking liquid in said channel and over which the cooking liquid passes in its travel to said reservoir, the elevation of the cooking liquid in said reservoir being below that in said channel and means for raising the cooking liquid from said reservoir to the beginning of said channel.

3. In a doughnut machine, a kettle having a channel along which the doughnuts are progressed through the flow of the cooking liquid, a reservoir at the end of said channel into which the cooking liquid discharges, a dam within said channel extending across the same, the uppermost portion of said dam being arranged for up and down movement, means for holding said portion of the dam in adjusted position, the elevation of the cooking liquid in said reservoir being below the elevation of the cooking liquid in said channel and means for raising the cooking liquid from the reservoir to the beginning of said channel.

4. In a doughnut machine, a kettle having a channel along which the doughnuts are progressed through the flow of the cooking liquid, a reservoir at the end of said channel into which the cooking liquid discharges, a weir extending across said channel and over which the cooking liquid flows in its passage to said reservoir, the elevation in said reservoir being below that in said channel and means for drawing cooking liquid from said reservoir and delivering it to the beginning of said channel.

5. In a doughnut machine, a kettle having a channel along which the doughnuts are progressed through the flow of the cooking liquid, a hood rectangular in form and enclosing a portion of said kettle, said channel having a run extending along one side of the hood, a second run connected therewith and extending along one end of the hood, a third run extending along the other side of the hood, a loop formed at the end of said third run, a diagonal run connected with said loop, another run extending parallel with said second run and connected with said diagonal run, another run extending parallel with first run and connected with said last named run and a loop connected to said first and last named runs.

6. In a doughnut machine, a kettle having a channel along which the doughnuts are progressed through the flow of the cooking liquid, a hood rectangular in form and enclosing a portion of said kettle, said channel having a run extending along one side of the hood, a second run connected therewith and extending along one end of the hood, a third run extending along the other side of the hood, a loop formed at the end of said third run, a diagonal run connected with said loop, another run extending parallel with said second run and connected with said diagonal run, another run extending parallel with first run and connected with said last named run, a loop connected to said first and last named runs, said last named loop being disposed outwardly of said hood and means connected to said first named run at said second named loop for discharging raw doughnuts into the same.

7. In a doughnut machine, a kettle having a channel along which the doughnuts are progressed through the flow of the cooking liquid, a hood, said channel having a portion thereof confined within said hood and a loop extending outwardly therefrom and disposed to one side of said hood, means for discharging raw doughnuts into said channel above a portion of the same at said loop and transmission means for operating said last named means, said transmission means being disposed outwardly to said hood and to the other side of said last named means.

8. In a doughnut machine, a kettle having a continuous circuitous channel along which doughnuts travel, a doughnut former at one locality in the channel for depositing raw doughnuts in the channel, a turner at another locality in the channel for inverting the doughnuts, an ejector in the channel for removing the cooked doughnuts therefrom, said channel having a reservoir therein following said ejector and forming a part of said passageway, flow impelling means in the channel disposed between the reservoir and the doughnut former for drawing the cooking liquid from the rservoir and discharging it back into the channel in advance of the doughnut former for causing flow of the cooking liquid along the channel to progress the doughnuts along the channel, and a dam extending across said channel at a locality between said ejector and reservoir and over which the cookink liquid flowing through the channel passes, said dam maintaining the cooking liquid at a predetermined gradient along the passageway.

9. In a doughnut machine, a kettle having a continuous circuitous channel along which doughnuts travel, a doughnut former at one locality in the channel for depositing raw doughnuts in the channel, a turner at another locality in the channel for inverting the doughnuts, an ejector in the channel for removing the cooked doughnuts therefrom, said channel having a reservoir therein following said ejector and forming a part of said passageway, flow impelling means in the channel disposed between the reservoir and the doughnut former for drawing the cooking liquid from the reservoir and discharging it back into the channel in advance of the doughnut former for causing flow of the cooking liquid along the channel to progress the doughnuts along the channel, and a dam extending across said channel at a locality between said ejector and reservoir and over which the cooking liquid flowing through the channel passes, said dam maintaining the cooking liquid at a predetermined gradient along the passageway, the uppermost portion of said dam being movable in a vertical direction and means for holding said portion of the dam in adjusted position.

ALEXANDER S. T. LAGAARD.